United States Patent
Kessler et al.

(10) Patent No.: US 9,061,651 B2
(45) Date of Patent: Jun. 23, 2015

(54) METHOD FOR CHARACTERIZING A PORTABLE DEVICE BY WAY OF AN ANTENNA ON BOARD A MOTOR VEHICLE

(71) Applicants: Sebastien Kessler, Dremil-Lafage (FR); Mohamed Cheikh, Toulouse (FR); Alexandru Takacs, Toulouse (FR)

(72) Inventors: Sebastien Kessler, Dremil-Lafage (FR); Mohamed Cheikh, Toulouse (FR); Alexandru Takacs, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/362,410

(22) PCT Filed: Dec. 12, 2012

(86) PCT No.: PCT/EP2012/005133
§ 371 (c)(1),
(2) Date: Jun. 3, 2014

(87) PCT Pub. No.: WO2013/087197
PCT Pub. Date: Jun. 20, 2013

(65) Prior Publication Data
US 2014/0324252 A1    Oct. 30, 2014

(30) Foreign Application Priority Data

Dec. 13, 2011 (FR) ...................... 11 03812

(51) Int. Cl.
*B60R 25/24* (2013.01)
*G06K 7/10* (2006.01)

(52) U.S. Cl.
CPC ............... *B60R 25/24* (2013.01); *B60R 25/245* (2013.01); *B60R 2325/205* (2013.01); *B60R 2325/103* (2013.01); *B60R 2325/105* (2013.01); *G06K 7/10* (2013.01)

(58) Field of Classification Search
CPC ........ B60R 25/10; B60R 25/20; B60R 25/24; B60R 25/241; B60R 25/243; B60R 25/245; B60R 2325/105; G06K 7/10; G07C 9/00174; G07C 9/00182; G07C 9/0019; G07C 9/00198; G07C 9/00206; G07C 9/00214; G07C 9/00222; G08C 17/00; G08C 17/02; G08C 17/04; G08C 17/06; G08C 2201/93
See application file for complete search history.

(56) References Cited

U.S. PATENT DOCUMENTS

| | | | |
|---|---|---|---|
| 6,243,004 B1 * | 6/2001 | Flick | 340/426.25 |
| 6,946,950 B1 * | 9/2005 | Ueno et al. | 340/10.1 |
| 2006/0164208 A1 * | 7/2006 | Schaffzin et al. | 340/5.64 |
| 2007/0126561 A1 * | 6/2007 | Breed | 340/426.13 |
| 2007/0290881 A1 * | 12/2007 | Nikitin et al. | 340/825.69 |
| 2008/0204237 A1 * | 8/2008 | Levin | 340/572.1 |
| 2009/0243796 A1 * | 10/2009 | Tieman | 340/5.72 |
| 2011/0112969 A1 * | 5/2011 | Zaid et al. | 705/50 |
| 2011/0183601 A1 * | 7/2011 | Hannon | 455/1 |
| 2011/0234370 A1 * | 9/2011 | Briese et al. | 340/5.6 |

FOREIGN PATENT DOCUMENTS

| | | |
|---|---|---|
| DE | 10 2009 054134 | 5/2011 |
| EP | 2 278 526 | 1/2011 |
| EP | 2 381 392 | 10/2011 |
| FR | 2 942 755 | 9/2010 |
| FR | 2 958 602 | 10/2011 |
| GB | 2 479 888 | 11/2011 |

OTHER PUBLICATIONS

International Search Report dated Feb. 13, 2013, corresponding to PCT/EP2012/005133.

* cited by examiner

*Primary Examiner* — Jerrah Edwards
*Assistant Examiner* — Tamara Weber
(74) *Attorney, Agent, or Firm* — Young & Thompson

(57) ABSTRACT

A method for characterizing, by way of at least one primary antenna (13, 31) on board a motor vehicle (10), a mobile device (20) of indeterminate type comprising a secondary antenna (21) of indeterminate size, approaching said motor vehicle (10) in an indeterminate approach mode, said primary antenna (13, 31) being intended to communicate with the secondary antenna (21) of the mobile device (20), and generating a voltage (V) across its terminals, the voltage being linked to an on-board system (11) of the motor vehicle (10), the invention proposes that the method of characterization comprises the following steps:

step 1: measurement by the on-board system (11) of the voltage across the terminals of the primary antenna (13, 31), over a series of predetermined time periods, step 2: computation of a voltage difference for each predetermined time period, step 3: comparison of the voltage difference with a value previously stored in the memory, step 4: if the voltage difference is positive, then the mobile device (20) is of dielectric type, otherwise if it is negative, it is of metallic type, step 5: if the voltage difference is zero over a predetermined time period above a threshold, then the mobile device (20) is in static approach mode, otherwise it is in dynamic approach mode.

12 Claims, 2 Drawing Sheets

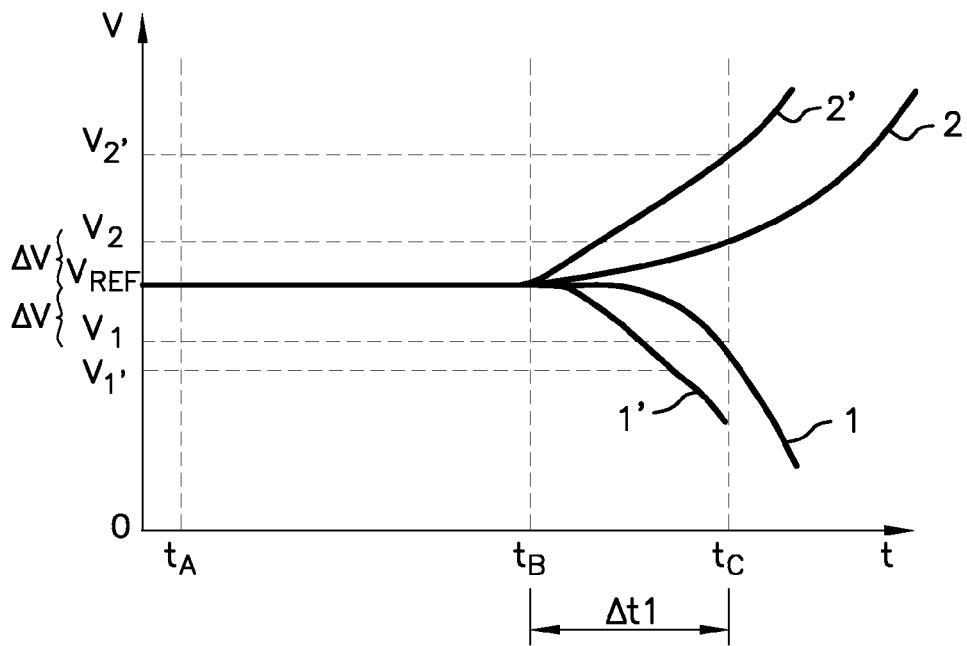
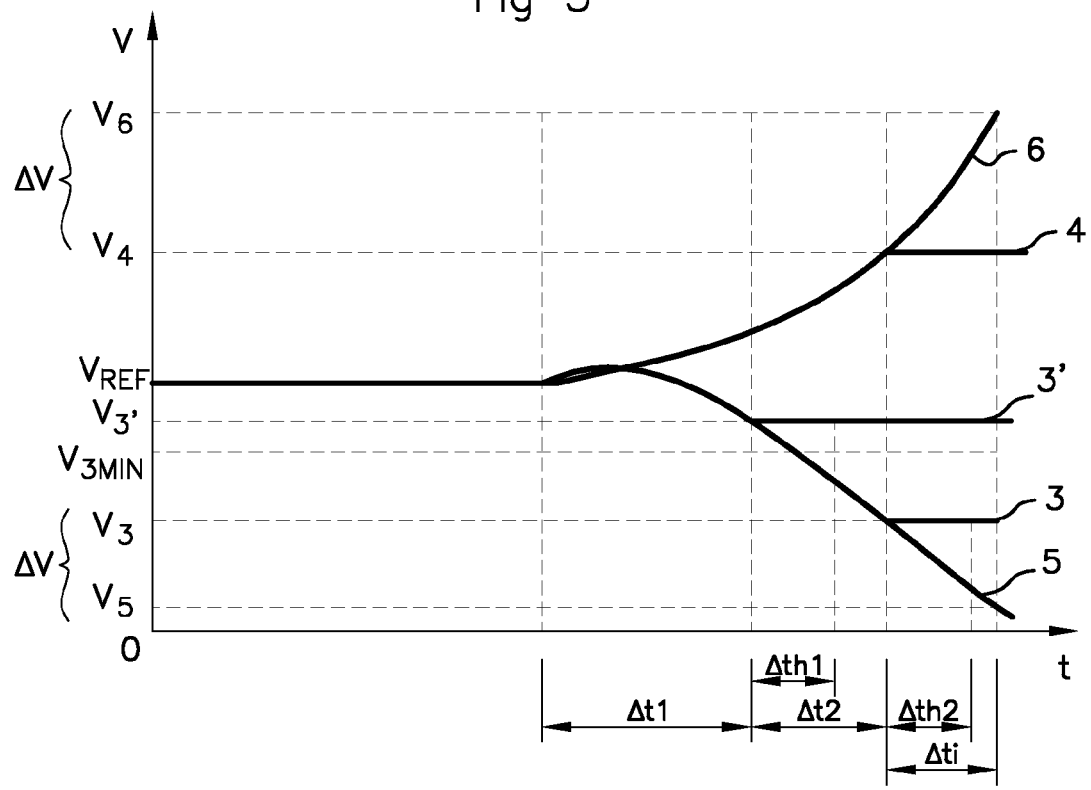

METHOD FOR CHARACTERIZING A PORTABLE DEVICE BY WAY OF AN ANTENNA ON BOARD A MOTOR VEHICLE

FIELD OF THE INVENTION

The invention relates to a method for characterizing a mobile device by way of an antenna on board a motor vehicle. The invention applies more particularly to systems of "hands free" access to motor vehicles. A system of so-called "hands free" access to a motor vehicle allows an authorized user to lock and/or unlock the opening panels of his vehicle without using a key. To do this, the vehicle proceeds with the identification of a tag or a remote control carried by the user and if the tag or the remote control is identified as belonging to the vehicle, then the vehicle locks or unlocks its opening panels.

BACKGROUND OF THE INVENTION

This "hands free" access system is known to those skilled in the art. It is generally composed of an electronic control unit on board the vehicle, of one or more radio frequency (RF) antenna(s) situated on the vehicle and of a tag or a remote control for identification purposes, comprising an RF antenna carried by the user.

An exchange of Identifying Data (ID) between the tag and the vehicle by way of the RF antennas allows the identification of the tag by the vehicle and the triggering of the locking or unlocking of the opening panels by the latter.

The ID can be contained in a mobile device other than a tag or a remote control, for example it can be contained in a mobile phone, carried by the user. More and more mobile phones are equipped with NFC ("Near Field Communication") technology, i.e. technology for communicating in the near field. To do this, they are equipped with an NFC antenna at 13.56 MHz. This near field communication makes it possible to exchange data over radio frequency waves at a short distance, i.e. a distance varying from 0 cm (i.e. the two mutually communicating objects are in contact) up to 10 cm. This type of communication is used to pay a toll, to pay for a parking place, etc, via the user's mobile phone. It can also be used in order to access a vehicle.

In the latter case, "hands free" access systems compatible with near field communication of NFC type comprise an NFC communication antenna at 13.56 MHz on the vehicle, generally incorporated into the driver's door. This antenna will be known as the first primary NFC antenna. The user can thus trigger the locking or unlocking of his vehicle by presenting his mobile phone, which also comprises an NFC antenna (which will be known as the secondary NFC antenna) in front of the primary NFC antenna of the vehicle. The use of the mobile phone instead of a tag opens up possibilities for functions and/or applications that the tag or the remote control cannot offer. This is due to the fact that the mobile phone itself comprises far more applications and functionalities than a simple "hands free" tag for accessing a vehicle. These functions and/or applications comprise the reading of audio files, the storage and transfer of telephone address books or any other data toward a compatible device by wireless communication of NFC type, etc.

For example, once the mobile phone has been identified by the vehicle, it transmits a user profile to the vehicle by NFC communication. This user profile is then used by the vehicle (more precisely by the electronic system on board the vehicle) to personalize the vehicle according to this user profile. It is thus possible to pre-adjust vehicle seats, or radio stations, or else to turn on the air conditioning etc. before the user enters his car, for example.

Some vehicles also comprise incorporated into the passenger compartment, for example on their dashboard, a mobile phone charging appliance, such as a mobile phone charger, that is compatible with NFC communication. That is to say, this charging device makes it possible, not only to electrically charge the mobile appliance, but also to exchange data by NFC communication between this appliance and the on-board system of the vehicle. To do so, this charging device further incorporates another NFC antenna, which will be called second primary NFC antenna. When the telephone is placed on the charger, in order to be recharged with electricity over a wired link or by induction, an NFC communication is triggered between the second primary NFC antenna of the vehicle and the secondary NFC antenna of the mobile phone. A transfer of data from the mobile phone toward the vehicle is then carried out. This data transfer can consist in a download of audio files of .mp3 ("Moving Picture Experts Group Audio layer 3") format, contained in the telephone that the user wishes to listen to over the hi-fi system of his vehicle. It can also consist in a download of the address book of the mobile phone so that this same address book can be consulted by the user on a screen of the vehicle (screen shared by the radio, and/or the navigation system of the vehicle).

Of course, when the mobile phone is placed on the charger, i.e. when it is found in immediate proximity or even in contact with the second primary NFC antenna, over a relatively long time period, a continuous download of files to the on-board vehicle system can be carried out. Long downloads, or downloads of files of large size are not possible when the telephone is presented only for a very short time period in front of the first primary NFC antenna dedicated to accessing the vehicle.

Since NFC communication takes place at short distances (in the order of a few centimeters), it is more secure than an RF communication that is performed a few meters away around the vehicle. This is why more and more hands free vehicle access tags offer, like mobile phones, the option of communication with the vehicle by NFC in addition to remote access via RF. In an example of use, the tag is detected far off, and its ID recognized by the vehicle by way of RF communication, then the unlocking of the opening panels of the vehicle is performed only when the user presents his tag at a few centimeters from the door, i.e. when the tag communicates with the vehicle by NFC. Access to the vehicle is then secured by the presence of the tag in immediate proximity to the vehicle, which limits the risks of break-ins.

A primary NFC antenna on board a vehicle is configured initially in an optimal manner to communicate with a single type of mobile device, i.e. either with a tag or with a mobile phone, and the latter as a function, furthermore, of the size of the secondary NFC antenna situated in this same mobile device.

Indeed, to ensure a communication of optimal quality, the size and the impedance of the primary NFC antenna must be configured differently, according to whether the primary NFC antenna communicates with a tag (whose secondary NFC antenna size is relatively small but whose impedance and therefore communication range is relatively large) or with a mobile phone (whose secondary NFC antenna is generally larger than that of a tag, but whose impedance and therefore communication range are relatively small.) The size of the primary NFC antenna, on board the vehicle, must be calibrated as a function of the size of the secondary NFC antenna situated in the mobile device and its impedance must be calibrated as a function of a typical distance or of an average distance of communication between the two. Ideally, both the primary and secondary NFC antennas of the vehicle and of the mobile device must be of substantially equal size to ensure good quality communication between them.

The configuration of the primary NFC antenna is important because, for example, a primary NFC antenna whose impedance is too high with respect to a given communication distance from the secondary NFC antenna creates problems of de-adaptation of the secondary NFC antenna of the mobile device and problems of communication between the two. Conversely, an excessively low impedance reduces the range of the primary NFC antenna and problems of detection of the mobile device by the vehicle. As to the size of the primary NFC antenna, if it is too small, it emits a very intense and localized electromagnetic field. And a larger secondary NFC antenna situated in the mobile device will have difficulty detecting this localized and intense field.

The configuration (the adjustment of the size and impedance) of the primary NFC antenna can be performed by way of the on-board electronic system of the vehicle using an electronic circuit comprising selectors and/or switches. These selectors and/or switch(es) make it possible to adapt the size of the antenna by linking or not linking several parts of the primary antenna with each other. They also make it possible to adjust the impedance by selecting for each part of the antenna a precise number of windings of the copper wire. These devices and methods of antenna configuration are the subject of another patent application, filed by the Applicant on the same day as the present application.

It will be understood that, due to the applications and/or functionalities and the antenna configuration, which differ according to whether the mobile device is a mobile phone or a tag (or any other device), it is necessary for the vehicle to be able to distinguish these mobile devices apart from each other and therefore to be able to characterize the type of the mobile device. This is necessary, not only in order to establish good quality NFC communication as fast as possible by configuring the antenna in a appropriate way, but also to avoid trying to establish impossible communications. Indeed, if the telephone/tag distinction is not made, the vehicle can pointlessly try to send vehicle data to the tag (as it does for a mobile phone) that the tag is not able to process as the mobile phone does. Specifically, the mobile phone can trigger applications on the basis of these data, whereas the tag, as explained previously, does not offer this possibility.

Moreover, it is also necessary to detect the approach mode of the mobile device toward the vehicle, i.e. to discern whether the mobile device is in dynamic approach, i.e. if it is approaching the vehicle, which is the case during access to the vehicle, or if it is in static approach, i.e. situated at a fixed distance with respect to the primary NFC antenna. Indeed, in the case where the mobile device is a mobile phone and it is at a fixed distance from the vehicle, the on-board system of the vehicle can trigger applications specific to the configuration of the vehicle or to the access to the vehicle, which is not possible with a tag (whether it is situated at a fixed distance or is approaching the vehicle), and which is also not possible when the mobile phone is quickly approaching the vehicle.

Moreover, the content of the communication between the mobile device and the vehicle differs according to whether the mobile device is at a fixed distance from the primary antenna dedicated to the vehicle access or is situated at a fixed distance from the secondary antenna situated on the charging device. In the latter case, if the mobile device is a mobile phone, then files of larger size and continuous downloads can be envisioned. Specific applications dedicated to the interaction with the navigation system or with the audio system of the vehicle can be launched. On the other hand, if the mobile device is a tag, this discernment with regard to the approach mode (static or dynamic) has no use, because no download can be performed with a tag.

SUMMARY OF THE INVENTION

With this aim, the invention proposes a method for characterizing the mobile device by way of a primary antenna on board a motor vehicle. By measuring the evolution of the voltage across the terminals of the primary antenna in an appropriate way, the invention makes it possible to:
   characterize the type of mobile device; i.e. to know whether it is a mobile phone or a tag, and therefore:
      to configure the primary antenna (size, impedance) accordingly, and
      to choose a mode of communication specific to the mobile device thus characterized,
   characterize the type of approach of this mobile device, i.e. determine whether the mobile device (telephone or tag) is approaching the vehicle, or if it is at a constant distance from the vehicle, and therefore choose the content of the mode of communication in order to launch applications in the case of the mobile device being a mobile phone (or any other kind of device allowing such applications).

More precisely, the invention proposes a method for characterizing, by way of at least one primary antenna on board a motor vehicle, a mobile device of indeterminate type comprising a secondary antenna of indeterminate size, approaching said motor vehicle in an indeterminate approach mode, said primary antenna being intended to communicate with the secondary antenna of said mobile device, and generating a voltage across its terminals, said voltage being linked to an on-board system of the motor vehicle, said method of characterization comprising the following steps:
   step 1: measurement by the on-board system of the voltage across the terminals of the primary antenna, over a series of predetermined time periods,
   step 2: computation by the on-board system of a voltage difference for each predetermined time period,
   step 3: comparison by the on-board system, for each predetermined time period, of the voltage difference thus computed with a value previously stored in the memory and,
   step 4:
      if the voltage difference is positive, then the mobile device is of dielectric type,
      if the voltage difference is negative, then the mobile device is of metallic type,
   step 5: once the type of the mobile device has been characterized,
      if the voltage difference is zero over a predetermined time period, which is above a time threshold then the mobile device is in static approach mode,
      otherwise the mobile device is in dynamic approach mode.

In an embodiment of the invention, the method of characterization furthermore comprises the following steps:
   step 2a: in step 2, computation, by the on-board system, of the absolute value of a gradient, created by the voltage difference, for each predetermined time period,
   step 3a: in step 3, comparison, by the on-board system, of the absolute value of the gradient thus computed with a value previously stored in the memory, and previously referenced as a function of the size of the secondary antenna of the mobile device and, step 4a: in step 4, characterization of the size of the secondary antenna of the mobile device as a function of this comparison.

According to the invention, the primary antenna can be a communication antenna of NFC type.

Advantageously, the mobile device of dielectric type is a vehicle access tag and/or the mobile device of metallic type is a mobile phone.

Appropriately, the dynamic approach mode consists in the approach of the mobile device toward the primary antenna and/or the static approach mode consists in a fixed distance between the mobile device and the primary antenna.

In a particular embodiment, if the mobile device is a mobile phone in static approach mode, then said method furthermore comprises the following step:

step 6: if the voltage across the terminals of the primary antenna is below a threshold, over a predetermined time period, which is above a time threshold, then the mobile phone is found in immediate proximity to the primary antenna.

The invention also applies to any device for characterizing a mobile device and/or motor vehicle implementing the method described above.

BRIEF DESCRIPTION OF THE DRAWINGS

Other objects, features and advantages of the present invention will become apparent upon reading the following description given by way of non-limiting example, made with reference to the appended schematic drawings in which:

FIG. 2 represents a first illustration of the evolution over time of the voltage across the terminals of a primary NFC antenna, according to the invention, FIG. 3 represents a second illustration of the evolution over time of the voltage across the terminals of a primary NFC antenna, according to the invention.

DETAILED DESCRIPTION OF THE INVENTION

Figure 1:
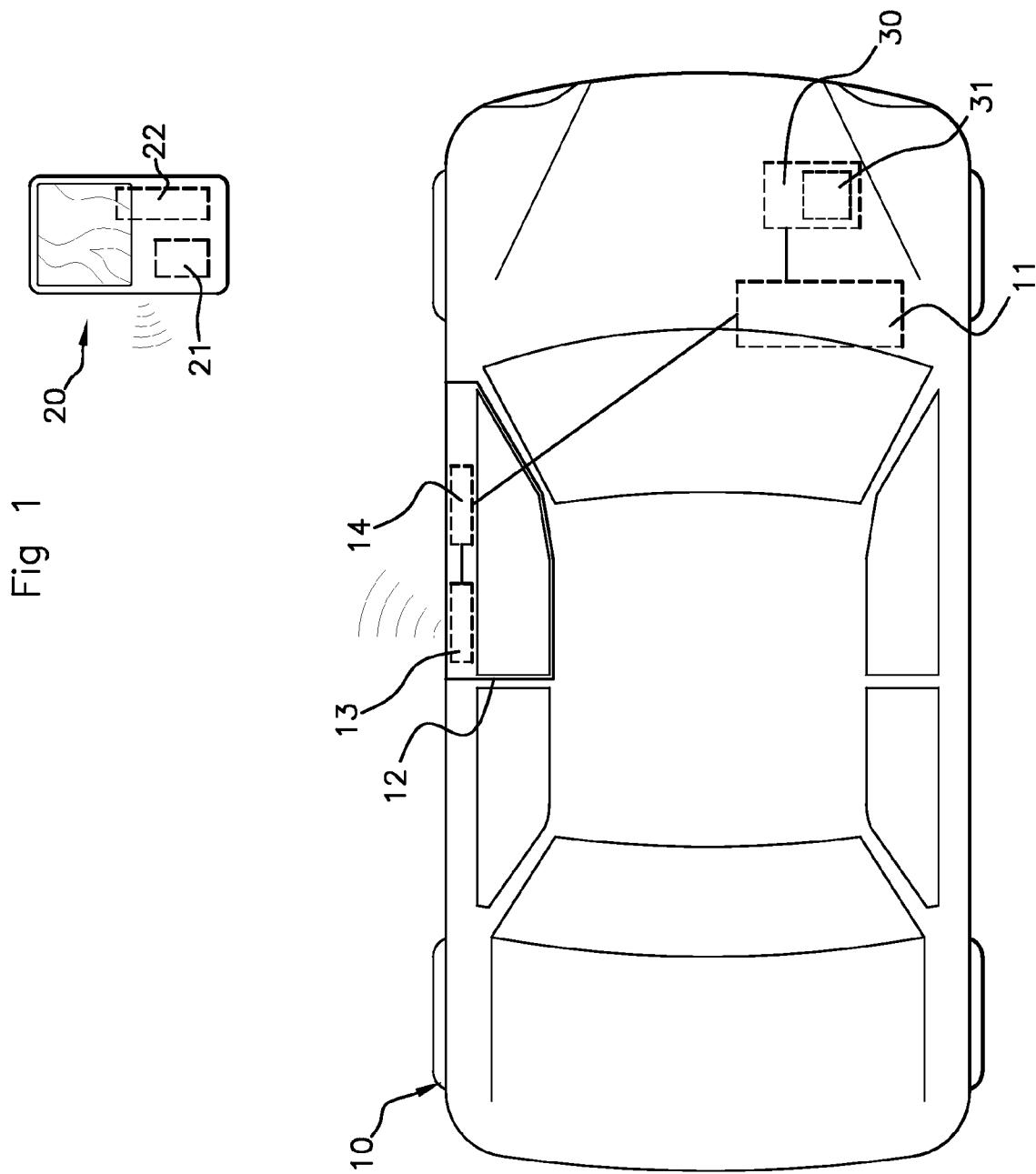
FIG. 1 represents a vehicle equipped with a "hands free" access system and a charger of a mobile device according to the invention.

FIG. 1 represents a motor vehicle 10 comprising an on-board electronic system 11, and of which at least one door 12 of said vehicle 10 comprises a control unit 14 of the "hands free" access device.

The control unit 14 is linked to a first primary NFC antenna 13, incorporated into the door 12 of the vehicle 10.

With the vehicle 10 is associated a mobile device 20 comprising a secondary NFC antenna 21 linked to a microcontroller 22. The control unit 14 of the vehicle 10 triggers the locking or unlocking of the door 12 based on the identification data exchanged between the first primary NFC antenna 13 and the secondary NFC antenna 21.

When the mobile device 20 approaches the vehicle 10, its presence is detected by the latter. The vehicle 10 then emits from its first primary NFC antenna 13 a request for identification, which is received by the mobile device 20. The mobile device 20 responds to this request by sending an ID that is specific to itself to the vehicle 10, by way of its secondary NFC antenna 21. This method of acknowledging the presence of a mobile device and its identification is known to those skilled in the art and will not be described here.

The vehicle 10 is also equipped in its passenger compartment, with a charging device or charger 30 of the mobile device 20, which is linked to the on-board electronic system 11. This charger 30 comprises a second primary NFC antenna 31.

As previously explained, in the case where the mobile device 20 is a mobile phone, the latter can send to the vehicle, upon the request for identification, a user profile in order to personalize the vehicle. And when the vehicle is unlocked, and the user enters the inside of his vehicle, the mobile phone once placed on the charger 30 makes it possible to trigger the activation of certain functions such as the download of audio files or other files toward the on-board system 11 of the vehicle 10.

The invention proposes a method whereby the vehicle characterizes:

the type of mobile device, distinguishing between a mobile phone and a tag and, the approach mode of the mobile device with respect to the vehicle, distinguishing between a dynamic approach and a static approach.

To do this, the invention proposes to measure the voltage across the terminals of the first and second primary NFC antennas 13 and 31 on board the vehicle and to monitor the evolution of this voltage over time. In the example below, the invention will be explained by considering that the first primary NFC antenna 13, but the invention applies in an identical way to the second primary NFC antenna 31.

When no mobile device 20 is found in proximity to the first primary NFC antenna 13 of the vehicle 10, i.e. when no mobile device is found in the NFC detection zone, the voltage V across the terminals of this first primary NFC antenna 13 is constant. This is represented in FIG. 2; between the instants $t_A$ and $t_B$, the voltage V has a constant value, which is that of a reference voltage $V_{REF}$. When a mobile device 20 enters the NFC detection zone of the first primary NFC antenna 13, the voltage across the terminals of the latter changes.

If the mobile device 20 is a tag, the voltage V increases by $V_{REF}$ to $V_2$ over a predetermined time period $\Delta t1$; the latter is represented in FIG. 2 by the curve 2. If the mobile device 20 is a mobile phone, the voltage V decreases by $V_{REF}$ to $V_1$ over a predetermined time period $\Delta t1$; the latter is represented in FIG. 2 by the curve 1.

This is because the tag includes few electronic circuits and is mainly constituted of plastic and/or dielectric parts. When an electromagnetic field is emitted by the first primary NFC antenna 13 of the vehicle 10, the tag acts as a barrier to this field and sends this field back toward the vehicle 10, this received electromagnetic field then being added to the emitted field, which increases the voltage across the terminals of the first primary NFC antenna 13 from the reference voltage $V_{REF}$ to $V_2$. The mobile phone itself includes many metallic parts that absorb the electromagnetic field emitted by the first primary NFC antenna 13, this absorption creates a de-adaptation of the first primary NFC antenna 13. The consequence of this de-adaptation is a voltage drop across the terminals of the first primary NFC antenna 13, which goes from $V_{REF}$ to $V_1$.

By computing over a predetermined time period $\Delta t1$ the voltage difference across the terminals of the first primary NFC antenna 13, $\Delta V=(V_{REF}-V_2)$ or $\Delta V=(V_{REF}-V_1)$, the onboard system 11 thus characterizes the type of mobile device 20 carried by the user. The on-board system 11 can then:

configure the first primary NFC antenna 13 in an optimal manner by selecting its size and/or its impedance according to values previously stored in the memory, listed by type of mobile device and coming from calibration tables contained in the on-board system 11 of the vehicle 10, and/or select the type of communication corresponding to the mobile device 20 thus characterized, i.e. launch a simple identification request when it is a tag or launch an identification request as well as other functionalities, such as a request for the user profile (for example), when it is a mobile phone.

The invention also proposes to follow the evolution of the voltage V in time t, over a succession of predetermined time periods $\Delta t1, \Delta t2 \ldots \Delta ti$ (cf. FIG. 3) in order to characterize the approach mode of the mobile device, once its type has been characterized. In the case where the mobile device has been characterized by the on-board system 11 of the vehicle 10 as being a mobile phone, if the voltage V continues to drop to $V=V_5$ over the time intervals $\Delta t2 \ldots \Delta ti$ as illustrated in the curve 5 in FIG. 3, this means that the mobile phone continues to approach the vehicle 10. The vehicle 10 then triggers an identification request, if this has not been done, or triggers the unlocking of the doors if the identification has already been performed. On the other hand, if the voltage V becomes constant at $V=V_3$, i.e. $\Delta V=0$, over a time interval $\Delta t2$, then that means that the mobile phone is now at a fixed distance from the first primary NFC antenna 13. If the mobile phone is at a fixed distance over a certain time period $\Delta t2$ which is above a predetermined time threshold $\Delta th1$ (cf. FIG. 3), then the on-board system 11 of the vehicle can launch other functions/applications, in addition to the identification request. By characterizing the approach mode of the mobile phone, dynamic or static, the on-board system 11 of the vehicle thus selects the type of communication and the content of the communication to be exchanged.

This characterization with regard to the approach mode is even more useful when the mobile phone is placed on the charger 30 of the vehicle 10. If the voltage V across the terminals of the second primary antenna 31 is constant at $V=V_3$, i.e. $\Delta V=0$, over a predetermined time period $\Delta ti$, which is above a time threshold $\Delta th2$, and this voltage value $V_3$ is below a certain threshold value $V_{3MIN}$ (cf. FIG. 3), that means not only that the mobile phone is situated at a fixed distance from the second primary antenna 31 but more precisely that the mobile device is situated is placed on the charger 30, i.e. in immediate proximity to the primary antenna 31, and that the download of files of larger size or continuous downloads can be performed at a sufficient download speed.

In the same way, if the mobile device 20 has been characterized by the on-board system 11 of the vehicle 10 as being a tag, and if the voltage V continues to rise (cf. curve 6 in FIG. 3) up to $V=V_6$ over a predetermined time period $\Delta ti$, this means that the tag continues to approach the vehicle 10 and that the on-board system 11 of the vehicle 10 can proceed with the identification if this has not been done or trigger the unlocking of the doors if the identification has already been performed. On the other hand, if the voltage V becomes constant at a fixed value, $V=V_4$, i.e. $\Delta V=0$, over a predetermined time period $\Delta ti$, above a time threshold (not represented) then that means that the tag is now situated at a constant distance from the first primary NFC antenna 13, but as the on-board system 11 has already characterized the mobile device 20 as being a tag, it will not trigger any communication including functionalities adapted to the mobile phone, thus reducing the power consumption of the on-board system 11 of the vehicle 10.

An improvement of the invention consists in measuring the gradient $P=\Delta V/\Delta t$ created by the increase or the drop in voltage $\Delta V$ with respect to the reference voltage $V_{REF}$. Indeed, the absolute value of the gradient P thus created is representative of the size of the secondary NFC antenna 21 situated in the mobile device 20 and this information on the size of the secondary antenna 21 is an item of information used by the on-board system 11 to accordingly configure the size and impedance of the first primary NFC antenna 13 and the second primary NFC antenna 31. This is illustrated in FIG. 2. The increase in the voltage represented by the curve 2' which is of a gradient $P_{2'}$ larger than the gradient $P_2$ of the curve 2 signifies the approach of a tag with a larger secondary antenna. In the same way, the gradient $P_{1'}$ of the curve 1', larger than the gradient $P_1$ of the curve 1, signifies the approach of a mobile phone comprising an antenna of larger size. The size of the secondary antenna 21 is listed in a table stored in the on-board system 11 of the vehicle as a function of the type of the mobile device 20 and of the gradient P thus computed, and the size and the impedance of the primary NFC antennas 13 and 31 are associated therewith.

The method for characterizing the type of mobile device 20 as well as the approach mode of such a device comprises the following steps:

step 1: measurement by the on-board system 11 of the voltage V across the terminals of the primary antenna 13, 31, over a series of predetermined time periods $\Delta t1, \Delta t2$, step 2: computation by the on-board system 11 of a voltage difference $\Delta V$ for each predetermined time period $\Delta t1, \Delta t2$, step 3: comparison by the on-board system 11, for each predetermined time period $\Delta t1, \Delta t2$, of the voltage difference $\Delta V$ thus computed with a value previously stored in the memory and, step 4:
if the voltage difference $\Delta V$ is positive, then the mobile device is of dielectric type,
if the voltage difference $\Delta V$ is negative, then the mobile device is of metallic type, step 5: once the type of mobile device has been characterized,
if the voltage difference $\Delta V$ becomes zero during a predetermined time period, which is above a time threshold $\Delta th1$, then the mobile device is in static approach mode,
otherwise the mobile device is in dynamic approach mode.

According to an embodiment, the method according to the invention comprises the following step:

step 6: if the voltage V across the terminals of the primary antenna 13, 31 is below a threshold $V_{3MIN}$, over a predetermined time period $\Delta ti$ which is above a time threshold $\Delta th2$ then the mobile phone is found in immediate proximity to the primary antenna 13, 31.

The invention therefore allows the system on board the vehicle, on the basis of the measurement of the voltage V across the terminals of each on-board primary NFC antenna:

to improve the quality of the communication (speed and effectiveness) with the mobile device, by configuring the primary antenna (impedance, size) and by selecting the mode of communication according to the type of mobile device, to reduce the power consumption of the on-board system by avoiding modes of communication and contents incompatible with the type of mobile device or incompatible with the approach mode.

Of course, the invention is not limited to the NFC antennas and is applicable to any radio frequency antenna. Similarly, the invention is not applicable to the distinction between a tag and a mobile phone but is applicable to the distinction between any kind of hands free access device, given that this device has been previously characterized (dielectric or metallic type) and therefore that its effect on the voltage V (upwards or downwards) can be measured.

The invention claimed is:

1. A method for characterizing, by way of at least one primary antenna (13, 31) on board a motor vehicle (10), a mobile device (20) of indeterminate type comprising a secondary antenna (21) of indeterminate size, approaching said motor vehicle (10) in an indeterminate approach mode, said primary antenna (13, 31) being intended to communicate with the secondary antenna (21) of said mobile device (20), and generating a voltage (V) across its terminals, said voltage (V) being linked to an on-board system (11) of the motor vehicle (10), the method comprising the following steps:

step 1: measuring by the on-board system (11) the voltage (V) across the terminals of the primary antenna (13, 31), over a series of predetermined time periods ($\Delta t1$, $\Delta t2$), step 2: computing by the on-board system (11) a voltage difference ($\Delta V$) for each predetermined time period ($\Delta t1$, $\Delta t2$), step 3: comparing by the on-board system (11), for each predetermined time period ($\Delta t1$, $\Delta t2$), the voltage difference ($\Delta V$) thus computed with a value previously stored in the memory and, step 4: determining whether the mobile device is of dielectric type or metallic type, if the voltage difference ($\Delta V$) is positive, then the mobile device (20) is of dielectric type, if the voltage difference ($\Delta V$) is negative, then the mobile device (20) is of metallic type, step 5: once the type of the mobile device has been characterized, determining whether the mobile device is in static approach mode or dynamic approach mode, if the voltage difference ($\Delta V$) is zero over a predetermined time period ($\Delta t2$), which is above a time threshold ($\Delta th1$) then the mobile device (20) is in static approach mode, otherwise the mobile device (20) is in dynamic approach mode.

2. The method for characterizing a mobile device (20) as claimed in claim 1, further comprising the following steps:

step 2a: in step 2, computing, by the on-board system (11), the absolute value of a gradient (P) created by the voltage difference ($\Delta V$) for each predetermined time period ($\Delta t1$, $\Delta t2$), step 3a: in step 3, computing, by the on-board system (11), the absolute value of the gradient (P) thus computed with a value previously stored in the memory, previously referenced as a function of the size of the secondary antenna (21) of the mobile device (20) and, step 4a: in step 4, characterizing the size of the secondary antenna (21) of the mobile device (20) as a function of this comparison.

3. The method for characterizing a mobile device (20) as claimed in claim 1 wherein, the primary antenna (13, 31) is a communication antenna of NFC type.

4. The method for characterizing a mobile device (20) as claimed in claim 1 wherein, mobile device (20) of dielectric type is a vehicle (10) access tag and/or the mobile device (20) of metallic type is a mobile phone.

5. The method for characterizing a mobile device (20) as claimed in claim 1 wherein, the dynamic approach mode consists in the approach of the mobile device toward the primary antenna (13, 31) and/or the static approach mode consists in a fixed distance between the mobile device (20) and the primary antenna (13, 31).

6. The method of characterization as claimed in claim 4 wherein, if the mobile device (20) is a mobile phone in static approach mode, then said method further comprises the following step:

step 6: if the voltage (V) across the terminals of the primary antenna (13, 31) is below a threshold ($V_{3MIN}$), over a predetermined time period ($\Delta ti$), which is above a time threshold ($\Delta th2$), then the mobile phone is found in immediate proximity to the primary antenna (13, 31).

7. The method for characterizing a mobile device (20) as claimed in claim 2 wherein, the primary antenna (13, 31) is a communication antenna of NFC type.

8. The method for characterizing a mobile device (20) as claimed in claim 2 wherein, the mobile device (20) of dielectric type is a vehicle (10) access tag and/or the mobile device (20) of metallic type is a mobile phone.

9. The method for characterizing a mobile device (20) as claimed in claim 3 wherein, the mobile device (20) of dielectric type is a vehicle (10) access tag and/or the mobile device (20) of metallic type is a mobile phone.

10. The method for characterizing a mobile device (20) as claimed in claim 2 wherein, the dynamic approach mode consists in the approach of the mobile device toward the primary antenna (13, 31) and/or the static approach mode consists in a fixed distance between the mobile device (20) and the primary antenna (13, 31).

11. The method for characterizing a mobile device (20) as claimed in claim 3 wherein, dynamic approach mode consists in the approach of the mobile device toward the primary antenna (13, 31) and/or the static approach mode consists in a fixed distance between the mobile device (20) and the primary antenna (13, 31).

12. The method for characterizing a mobile device (20) as claimed in claim 4 wherein, the dynamic approach mode consists in the approach of the mobile device toward the primary antenna (13, 31) and/or the static approach mode consists in a fixed distance between the mobile device (20) and the primary antenna (13, 31).

* * * * *